United States Patent
Elman et al.

(10) Patent No.: US 7,163,724 B2
(45) Date of Patent: *Jan. 16, 2007

(54) MULTILAYER OPTICAL COMPENSATOR, LIQUID CRYSTAL DISPLAY, AND PROCESS

(75) Inventors: James F. Elman, Fairport, NY (US); Dennis J. Massa, Pittsford, NY (US); Charles C. Anderson, Penfield, NY (US); Tomohiro Ishikawa, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/409,931

(22) Filed: Apr. 24, 2006

(65) Prior Publication Data

US 2006/0193975 A1    Aug. 31, 2006

Related U.S. Application Data

(62) Division of application No. 10/631,152, filed on Jul. 31, 2003, now Pat. No. 7,083,835.

(51) Int. Cl.
   *G02F 1/3363*   (2006.01)
(52) U.S. Cl. .............. 428/1.3; 428/1.1; 427/162; 427/163.3; 349/117; 349/118; 349/119; 349/120; 349/121
(58) Field of Classification Search .......... 428/1.1–1.3; 349/117–121; 427/162, 163.3
   See application file for complete search history.

(56) References Cited

U.S. PATENT DOCUMENTS

| | | |
|---|---|---|
| 5,480,964 A | 1/1996 | Harris et al. |
| 5,750,641 A * | 5/1998 | Ezzell et al. ............... 528/353 |
| 6,238,753 B1 | 5/2001 | Ezzell et al. |
| 6,512,561 B1 * | 1/2003 | Terashita et al. ............. 349/118 |
| 6,628,359 B1 * | 9/2003 | Terashita et al. ............. 349/120 |
| 6,630,973 B1 * | 10/2003 | Matsuoka et al. ........... 349/117 |
| 6,853,424 B1 * | 2/2005 | Elman et al. ................ 349/117 |

(Continued)

FOREIGN PATENT DOCUMENTS

EP    0 544 013    6/1993

(Continued)

OTHER PUBLICATIONS

James Elman, Declaration under Rule 132, dated Nov. 21, 2005, from divisional application U.S. Appl. No. 10/631,152.*

(Continued)

*Primary Examiner*—Nasser Ahmad
*Assistant Examiner*—Sow-Fun Hon
(74) *Attorney, Agent, or Firm*—Arthur E. Kluegel (57) ABSTRACT

A process for manufacturing a multilayer compensator comprising one or more polymeric A layers and one or more polymeric B layers, wherein said A layers comprise a polymer having an out-of-plane birefringence not more negative than −0.01, said B layers comprise an amorphous polymer having an out-of-plane birefringence more negative than −0.01, and the overall in-plane retardation ($R_{in}$) of said multilayer compensator is greater than 20 nm and the out-of-plane retardation ($R_{th}$) of said multilayer compensator is more negative than −20 nm wherein the process employs laminating layers or coating the layers from solvent.

17 Claims, 7 Drawing Sheets

U.S. PATENT DOCUMENTS

| | | | |
|---|---|---|---|
| 6,937,310 B1 * | 8/2005 | Elman et al. | 349/118 |
| 6,964,795 B1 * | 11/2005 | Elman et al. | 428/1.3 |
| 6,995,395 B1 * | 2/2006 | Elman et al. | 257/59 |
| 7,083,835 B1 * | 8/2006 | Elman et al. | 428/1.3 |
| 2001/0026338 A1 | 10/2001 | Aminaka | |
| 2002/0192445 A1 | 12/2002 | Ezzell et al. | |
| 2003/0086033 A1 | 5/2003 | Sasaki et al. | |
| 2003/0219549 A1 | 11/2003 | Shimizu | |

FOREIGN PATENT DOCUMENTS

| | | |
|---|---|---|
| EP | 1 118 885 | 7/2001 |
| JP | 2002-210766 | 7/2002 |

OTHER PUBLICATIONS

Arthur Kluegel, Rermarks section dated Nov. 21, 2005, from divisional application U.S. Appl. No. 10/631,152.*

J. F. Elman et al, "Multilayer Optical Compensator, Liquid Crystal Display, and Process", U.S. Appl. No 10/431,742 (D-84083A) filed May 8, 2003.

* cited by examiner

OFF
FIG.3A

MULTILAYER OPTICAL COMPENSATOR, LIQUID CRYSTAL DISPLAY, AND PROCESS

CROSS-REFERENCE TO RELATED APPLICATIONS

This application is a Divisional of U.S. Ser. No. 10/631,152 filed on Jul. 31, 2003, now U.S. Pat. No. 7,083,835 the contents of which are incorporated herein.

FIELD OF THE INVENTION

The present invention relates to a process for making a multilayer optical compensator for liquid crystal displays comprising polymeric A and polymeric B layers exhibiting particular birefringent properties. The invention also relates to liquid crystal displays using the compensator.

BACKGROUND OF THE INVENTION

Liquid crystals are widely used for electronic displays. In these display systems, a liquid crystal cell is typically situated between a pair of polarizer and analyzers. An incident light polarized by the polarizer passes through a liquid crystal cell and is affected by the molecular orientation of the liquid crystal, which can be altered by the application of a voltage across the cell. The altered light goes into the analyzer. By employing this principle, the transmission of light from an external source, including ambient light, can be controlled. The energy required to achieve this control is generally much less than required for the luminescent materials used in other display types such as cathode ray tubes (CRT). Accordingly, liquid crystal technology is used for a number of electronic imaging devices, including but not limited to digital watches, calculators, portable computers, electronic games for which light-weight, low-power consumption and long-operating life are important features.

Contrast, color reproduction, and stable gray scale intensities are important quality attributes for electronic displays, which employ liquid crystal technology. The primary factor limiting the contrast of a liquid crystal display (LCD) is the propensity for light to "leak" through liquid crystal elements or cells, which are in the dark or "black" pixel state. Furthermore, the leakage and hence contrast of a liquid crystal display are also dependent on the direction from which the display screen is viewed. Typically the optimum contrast is observed only within a narrow viewing angle range centered about the normal incidence to the display and falls off rapidly as the viewing direction deviates from the display normal. In color displays, the leakage problem not only degrades the contrast but also causes color or hue shifts with an associated degradation of color reproduction.

LCDs are quickly replacing CRTs as monitors for desktop computers and other office or house hold appliances. It is also expected that the number of LCD television monitors with a larger screen size will sharply increase in the near future. However, unless problems of viewing angle dependence such as coloration, degradation in contrast, and an inversion of brightness are solved, LCD's application as a replacement of the traditional CRT will be limited.

Figure 2A:
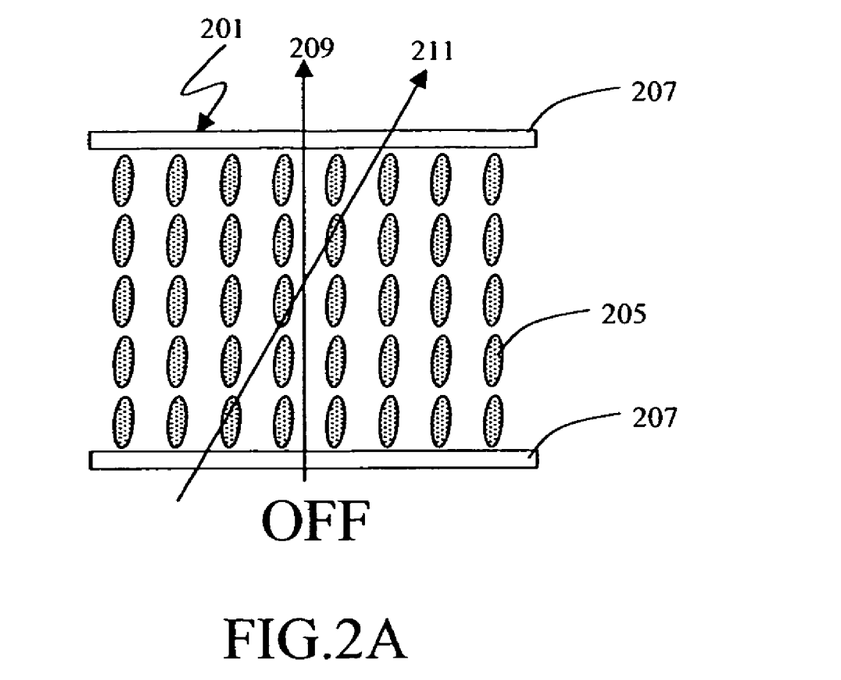
FIG. 2A and FIG. 2B are schematics showing, respectively, the typical ON and OFF state of the VA liquid crystal cell.
Figure 2B:
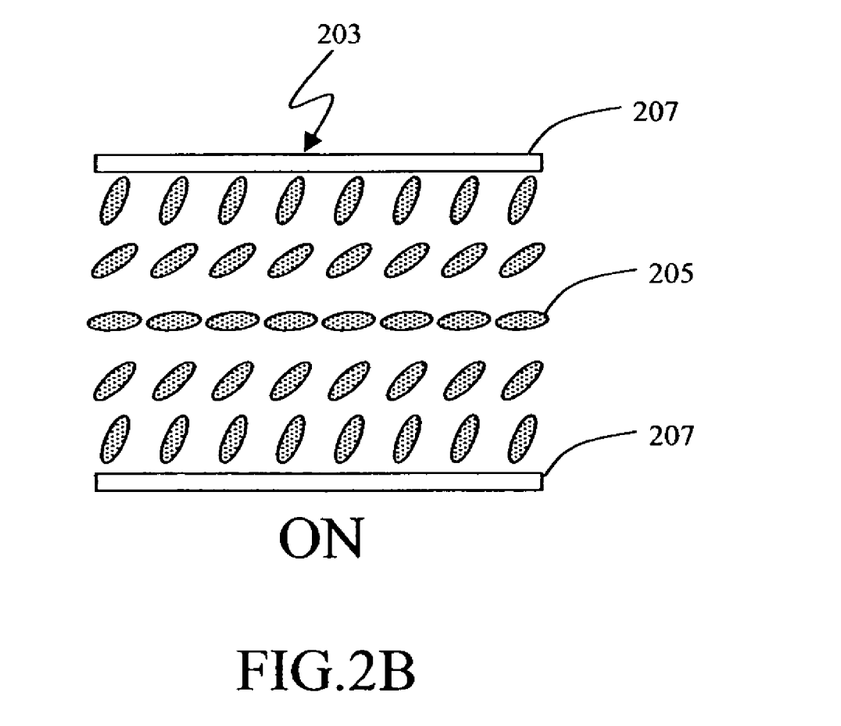

A Vertically-Aligned liquid crystal display (VA-LCD) offers an extremely high contrast ratio for normal incident light. FIG. 2A and FIG. 2B are the schematics of VA liquid crystal cell in OFF 201 and ON 203 states. In its OFF state, the liquid crystal optic axis 205 is almost perpendicular to the substrate 207, FIG. 2A. With an applied voltage, the optic axis 205 is tilted away from the cell normal, FIG. 2B. In the OFF state, light does not see the birefringence in the normal direction 209, giving the dark state that is close to that of orthogonally crossed polarizers. However, obliquely propagated light 211 picks up phase retardation giving light leakage. This results in a poor contrast ratio in some viewing angle range.

Figure 3A:
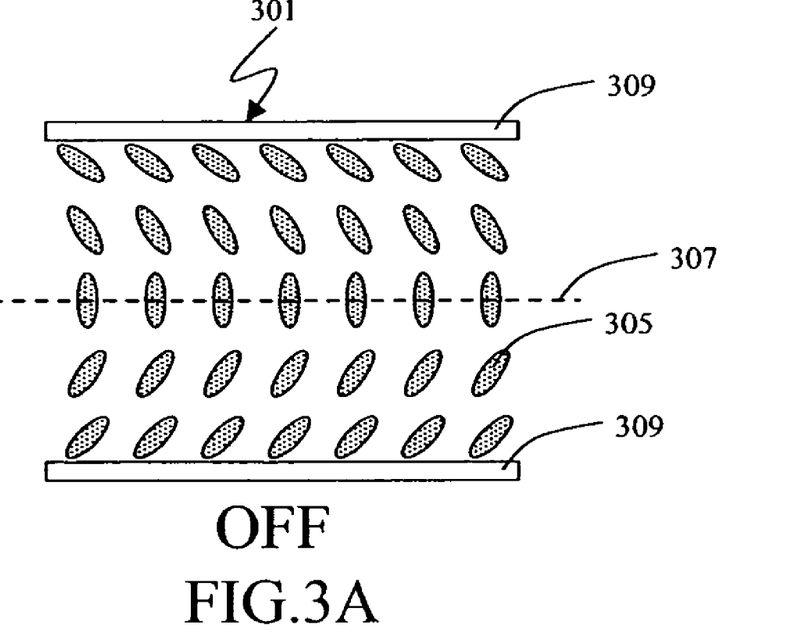
FIG. 3A and FIG. 3B are schematics showing, respectively, the typical ON and OFF states of the OCB liquid crystal cell.
Figure 3B:
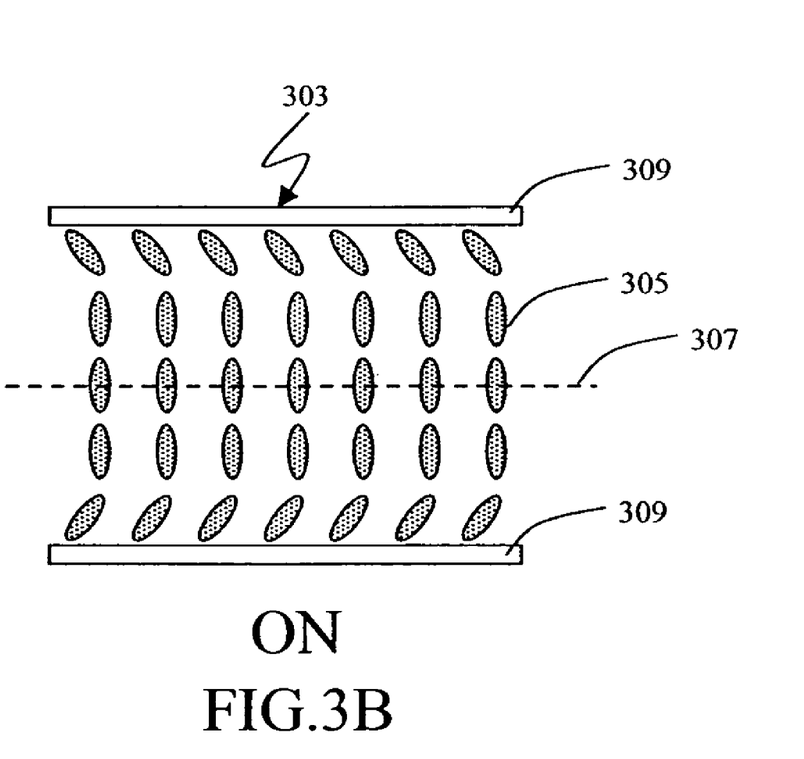

A bend aligned nematic liquid crystal display, also referred as an Optically Compensated Bend Liquid Crystal Display (OCB-LCD) uses a nematic liquid crystal cell based on the symmetric bend state. In its actual operation, the brightness of the display using the bend aligned nematic liquid crystal cell is controlled by an applied voltage or field that leads to a different degree in the bend orientation within the cell as shown in FIG. 3A (OFF) 301 and FIG. 3B (ON) 303. In both states, the liquid crystal optic axis 305 takes symmetric bend state around the cell middle plane 307. In the On state, the optic axis becomes substantially perpendicular to the cell plane except near the cell substrates 309. OCB mode offers faster response speed that is suitable to the liquid crystal display television (LCD-TV) application. It also has advantages in viewing angle characteristic (VAC) over conventional displays, such as Twisted Nematic liquid crystal display (TN-LCD)

The above-mentioned two modes, due to their superiority over the conventional TN-LCD, are expected to dominate the high-end application such as LCD-TV. However, practical applications of both OCB and VA-LCDs require optical compensating means to optimize the VAC. In both modes, due to the birefringence of liquid crystal and crossed polarizer, VAC suffers deterioration in contrast when the displays are viewed from oblique angles. Use of biaxial films have been suggested to compensate the OCB (U.S. Pat. No. 6,108,058) and VA (JP1999-95208) LCDs. In both modes, liquid crystals align sufficiently perpendicular to the plane of the cell in ON(OCB) or OFF (VA) states. This state gives positive $R_{th}$, thus the compensation films have to have sufficiently large negative $R_{th}$ for satisfactory optical compensation. The need for a biaxial film with a large Rth is also common for Super Twisted Nematic Liquid Crystal Display (STN-LCD).

Several methods of manufacturing biaxial films with sufficient negative value of $R_{th}$ suitable for compensating LCD modes such as OCB, VA and STN have been suggested.

US 2001/0026338 discloses a use of retardation increasing agent in combination with triacetylcellulose (TAC). The retardation-increasing agent is chosen from aromatic compounds having at least two benzene rings. By stretching agent doped TAC, one can generate both $R_{th}$ and $R_{in}$. The problems with this method is that the amount of the doping of the agent. To generate the desired effects of increasing $R_{th}$ and $R_{in}$ the necessary amount of agent is high enough to cause coloration. With this method, it is difficult to control the values of $R_{th}$ and $R_{in}$ independently.

Sasaki et al. proposes (US2003/0086033) the use of cholesteric liquid crystal disposed on the positively birefringent thermoplastic substrate. The pitch of the cholesteric liquid crystal (CHLC) is shorter than the wavelength of the visible light, thus properly aligned CHLC exhibits form birefringence giving negative $R_{th}$. $R_{in}$ is controlled by adjusting the stretching amount of the thermoplastic substrate. The method enables one to adjust $R_{th}$ and $R_{in}$ separately. However, the use of short pitch CHLC not only makes the manufacturing cost high but also complicates the processing due to the alignment procedure.

JP2002-210766 discloses the use of propionyl or butyryl substituted TAC. They show higher birefringence than ordinary TAC. Thus, by biaxially stretching the substituted TAC film, one generates $R_{in}$ and $R_{th}$. The method does not require any additional coating or layer but it suffers a difficulty of independent control of $R_{in}$ and $R_{th}$.

Thus, it is a problem to be solved to provide a multilayer optical compensator with independently controlled $R_{th}$ and $R_{in}$ that can be readily manufactured.

SUMMARY OF THE INVENTION

The invention provides a process for making a multilayer compensator comprising one or more polymeric A layers and one or more polymeric B layers, wherein said A layers comprise a polymer having an out-of-plane birefringence not more negative than −0.01, and said B layers comprise an amorphous polymer having an out-of-plane birefringence more negative than −0.01, and the overall in-plane retardation ($R_{in}$) of said multilayer compensator is greater than 20 nm and the out-of-plane retardation ($R_{th}$) of said multilayer compensator is more negative than −20 nm, wherein the process employs laminating layers or coating the layers from solvent. The invention also provides a multilayer compensator and an LCD incorporating the compensator of the invention.

The invention multilayer optical compensator is readily manufactured and provides the required value of the $R_{in}$ and the $R_{th}$ values.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
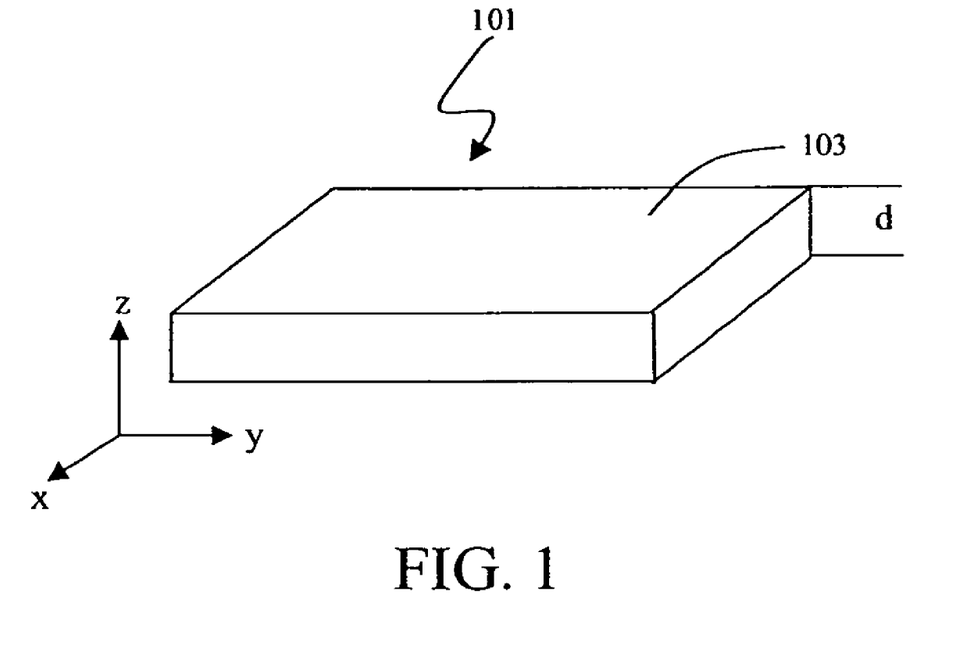
FIG. 1 is a view of a typical layer with thickness d and x-y-z coordinate system attached to the layer.

The following definitions apply to the description herein:
Optic axis refers to the direction in which propagating light does not see birefringence.
ON and OFF state refers to the state with and without applied voltage to the liquid crystal cell.
In-plane phase retardation, $R_{in}$, of a layer 101 shown in FIG. 1 is a quantity defined by (nx−ny)d, where nx and ny are indices of refraction in the direction of x and y. The x axis is taken as a direction of maximum index of refraction in the x-y plane and the y direction is perpendicular to the x axis. For stretched positively birefringent layers, x corresponds to the direction of primary stretch. The x-y plane is parallel to the plane 103 of the layer. d is a thickness of the layer in the z-direction. The quantity (nx−ny) is referred to as in-plane birefringence, $\Delta n_{in}$. The values of $\Delta n_{in}$ and $R_{in}$ hereafter are given at wavelength λ=550 nm.

Out of-plane phase retardation, $R_{th}$, of a layer 101 shown in FIG. 1, herein, is a quantity defined by [nz−(nx+ny)/2]d. nz is the index of refraction in z-direction. The quantity [nz−(nx+ny)/2] is referred to as out-of-plane birefringence, $\Delta n_{th}$. If nz>(nx+ny)/2, $\Delta n_{th}$ is positive, thus the corresponding $R_{th}$ is also positive. If nz<(nx+ny)/2, $\Delta n_{th}$ is negative and $R_{th}$ is also negative. The values of $\Delta n_{th}$ and $R_{th}$ hereafter are given at λ=550 nm.

Intrinsic Birefringence $\Delta n_{int}$ of a polymer herein refers to the quantity defined by ($n_e - n_o$), where $n_e$, and $n_o$ are extraordinary and ordinary index of the polymer, respectively. Intrinsic birefringence is determined by factors, such as the polarizabilities of functional groups and their bond angles with respect to the polymer chain. The actual birefringence (in-plane $\Delta n_{in}$ or out-of-plane $\Delta n_{th}$) of a polymer layer depends on the process of forming it, thus the order parameter, and the $\Delta n_{int}$.

Amorphous means a lack of long-range order. Thus an amorphous polymer does not show long-range order as measured by techniques such as X-ray diffraction.

Chromophore means an atom or group of atoms that serve as a unit in light adsorption. (*Modern Molecular Photochemistry* Nicholas J. Turro Editor, Benjamin/Cummings Publishing Co., Menlo Park, Calif. (1978) Pg 77). Typical chromophore groups include vinyl, carbonyl, amide, imide, ester, carbonate, aromatic (i.e. heteroaromatic or carbocylic aromatic such as phenyl, naphthyl, biphenyl, thiophene, bisphenol), sulfone, and azo or combinations of these groups.

Non-visible chromophore means a chromophore that has an absorption maximum outside the range of 400–700 nm.

Contiguous means that articles are in contact with each other. In two contiguous layers, one layer is in direct contact with the other. Thus, if a polymer layer is formed on the substrate by coating, the substrate and the polymer layers are contiguous.

The invention provides a multilayer compensator comprising one or more polymeric A layers and one or more polymeric B layers, wherein said A layers comprises a polymer having an out-of-plane birefringence not more negative than −0.01, and said B layer comprises an amorphous polymer having an out-of-plane birefringence more negative than −0.01, and the overall in-plane retardation ($R_{in}$) of said multilayer compensator is greater than 20 nm and the out-of-plane retardation ($R_{th}$) of said multilayer compensator is more negative than −20 nm. The A layer is made from polymer film. The A layer has positive intrinsic birefringence, $\Delta n_{int}$. Examples of such a polymer include, TAC, cellulose acetate butylate (CAB), cyclic polyolefin, polycarbonate, polysulfonate, and other polymers known to those skilled in the art. These polymeric materials can be made into a film form by solvent casting, heat extrusion, or other methods. To generate $R_{in}$ that is greater than 20 nm in the A layer, any viable methods can be used, however, most commonly practiced procedure is stretching. As the A layers are made from polymer film with positive $\Delta n_{int}$, indices of refraction in the plane of the layer satisfies nx>ny, where "x" denotes the primary direction of stretching and "y" is the direction perpendicular to x. By stretching polymeric materials, individual polymer chain segments are oriented predominantly to the direction of primary stretch, thus increase the birefringence of polymer layer. As it is necessary to orient the polymer segment, the stretching has to be done above the glass transition temperature of the polymeric materials. Thus, the polymeric film is heated above $T_g$ and stretched. Other method is to stretch the film while solvents are incorporated within the film. With this method, the film can be stretched immediately after the polymer is solvent-cast into a film form. The film can be stretched uniaxially or biaxially. In uniaxial stretching, the film is stretched into one direction. However, by unxiaxial stretching, it is difficult to control the films three indices of refraction, nx, ny and nz, where nz is an index of refraction in the film normal direction. This is particularly true when the stretching of the film in the x direction is large enough so that there is a contraction in the y direction. This contraction effectively gives stretching in the film normal direction z, thus increases nz. In biaxial stretching, where two stretching directions x and y are perpendicular to each other, the undesired shrinkage caused by the stretch in the primary stretching direction (say in x direction) is prevented by simultaneous stretch in the secondly direction (y). Thus the increase in nz can effectively be prevented. Means to stretch are not particularity limited so long the stretched film has sufficient uniformity in three indices of refraction. The polymeric A layer has $\Delta n_{th}$ not more negative than −0.01. The polymeric A layers of the multilayer compensator are such that the overall in-plane retardation ($R_{in}$) of said multilayer compensator is suitably greater than 20 nm, desirably between than 30 and 200 nm, and conveniently between 30 nm and 150 nm.

The polymeric B layers will typically be solvent coated onto the A layer. This solvent coating could be accomplished by spin coating, hopper coating, gravure coating, wire bar coating or other coating methods known to those skilled in the art. The coated B layers are contiguous to the A layer.

The B layer is coated from a solution containing a polymer that yields high negative birefringence that is more negative than −0.01 upon solvent coating. To produce negative $\Delta n_{th}$ (or $R_{th}$), polymers with positive $\Delta n_{int}$ are used. Such polymers usually contain non-visible chromophore groups such as vinyl, carbonyl, amide, imide, ester, carbonate, sulfone, azo, and aromatic groups (i.e. benzene, naphthalate, biphenyl, bisphenol A) in the polymer backbone. Examples of such polymers are polyesters, polycarbonates, polyimides, polyetherimides, and polythiophenes. One could also add fillers and non-polymeric molecules to these polymers for the second layer.

Desirably, polymers to be used in the B layers will not have chromophores off of the backbone. An example of such an undesirable polymer with chromophores in and off the backbone would be polyarylates possessing the fluorene group. The glass transition temperature ($T_g$) of the polymers used in the B layer is significant. It should be above 180° C. to achieve the desired results. The polymers used in the B layers could be synthesized by a variety of techniques: condensation, addition, anionic, cationic or other common methods of synthesis could be employed.

The thickness of each B layer should be less than 30 µm. Typically it should be from 0.1 µm to 20 µm. Conveniently it should be from 1.0 µm to 10 µm. Desirably it should be from 2 µm to 8 µm.

The combined thickness of the multilayer optical compensator should be less than 200 µm. Typically it should be from 40 µM to 150 µm. Desirably it should be from 80 µm to 110 µm.

The B layers should be of sufficient thickness so that the out-of-plane retardation of the B layers is more negative than −20 nm. Typically it should be from −600 nm to −60 nm. Conveniently it should be from −500 nm to −50 nm. Desirably it should be from −400 nm to −50 nm.

Reference will now be made to the drawings in which the various elements of the present invention will be given numerical designations and in which the invention will be discussed so as to enable one skilled in the art to make and use the invention. It is to be understood that elements not specifically shown or described may take various forms well known to those skilled in the art.

Figure 4A:
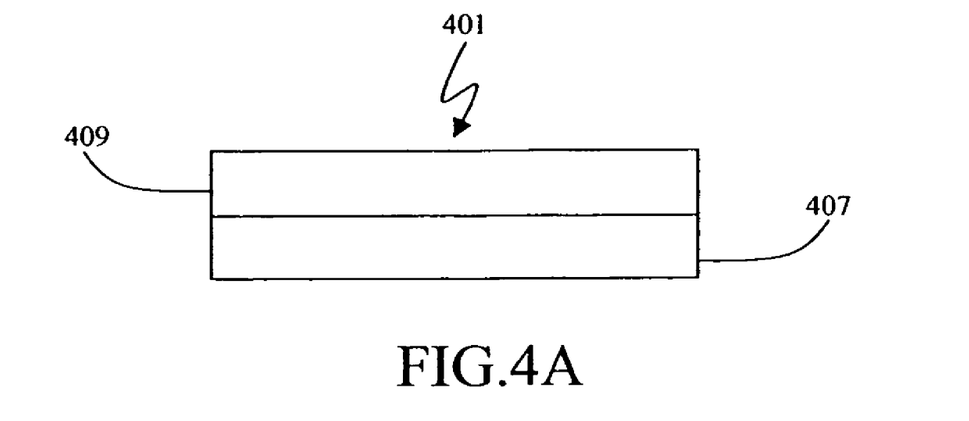
FIG. 4A, FIG. 4B and FIG. 4C are elevation schematics of the multilayer optical compensator of the invention.
Figure 4B:
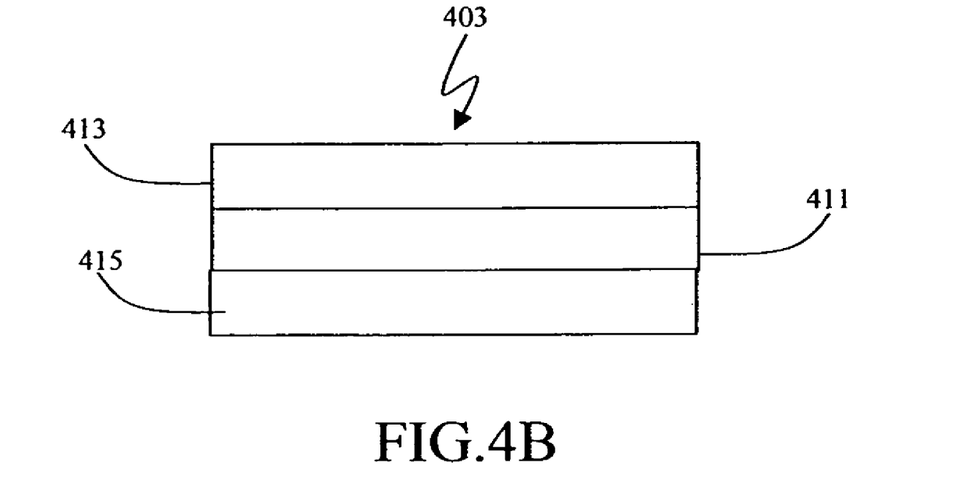
Figure 4C:
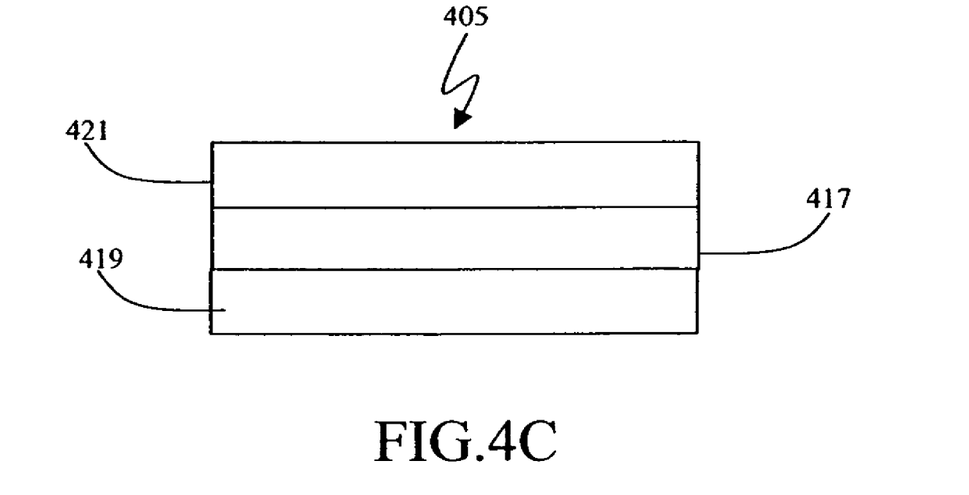

FIG. 4A, FIG. 4B and FIG. 4C are elevation schematics of the exemplary multilayer optical compensators in accordance with the invention. Compensator 401 in FIG. 4A has a structure in which a B layer 409 is disposed on an A layer 407. The A layer 407 and the B layer 409 are contiguous. It is also possible to have two B layers 413, 415 disposed on one A layer 411 such as the compensator 403 in FIG. 4B. In other case 405, one B layer 417 is sandwiched by two A layers 419, 421. The compensator 405 can be formed, for example, by laminating contiguous layers of A 421 and B 417, and the single layer of A 419. The lamination is done at the interface of B layer 417 and A layer 419, and the two layers 417 and 419 may or may not be contiguous depending on the method of the lamination. One skilled in the art could conceive of more complex structures.

Figure 5A:
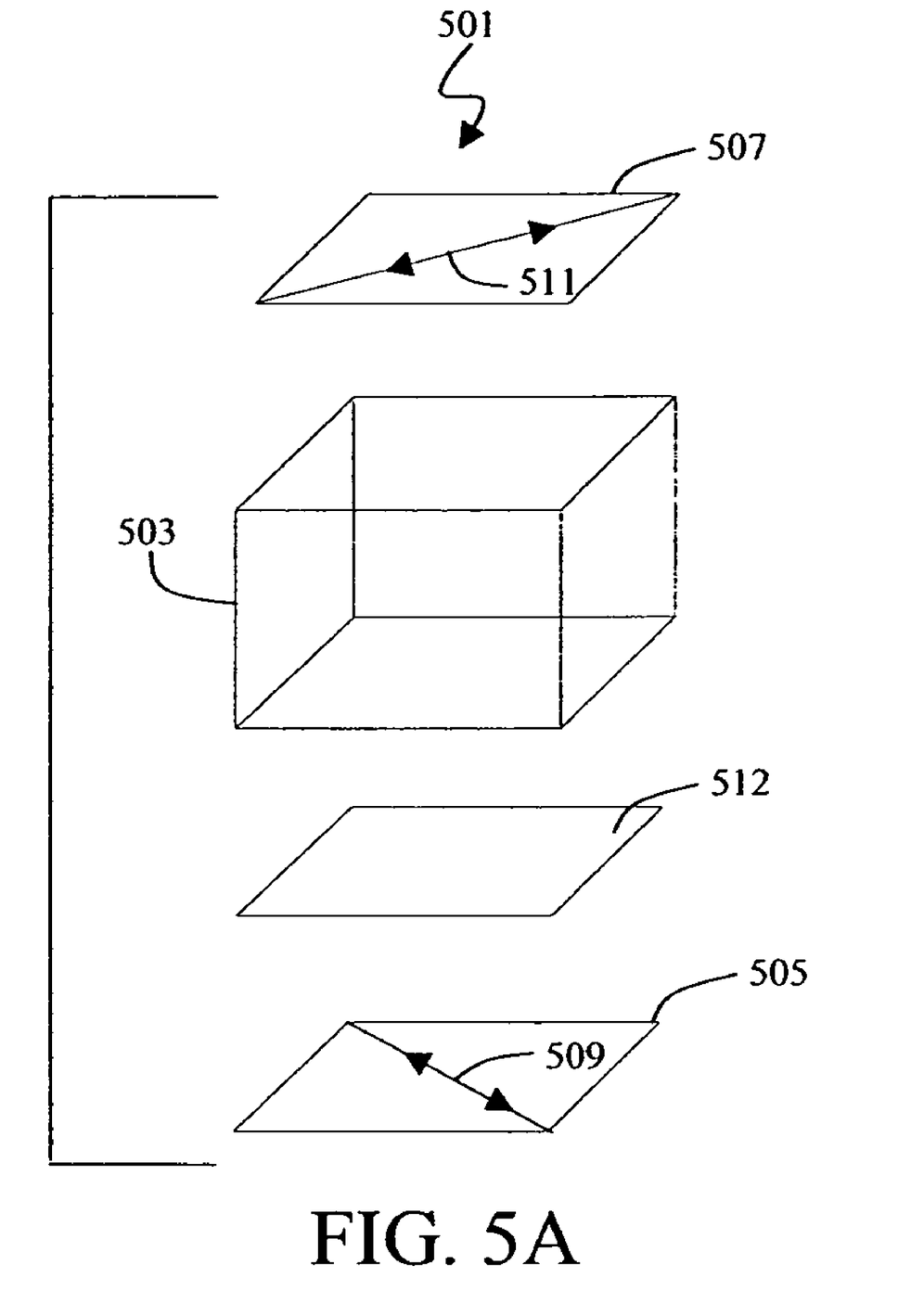
FIG. 5A, FIG. 5B and FIG. 5C are schematics of a liquid crystal display with multilayer optical compensators of the invention.
Figure 5B:
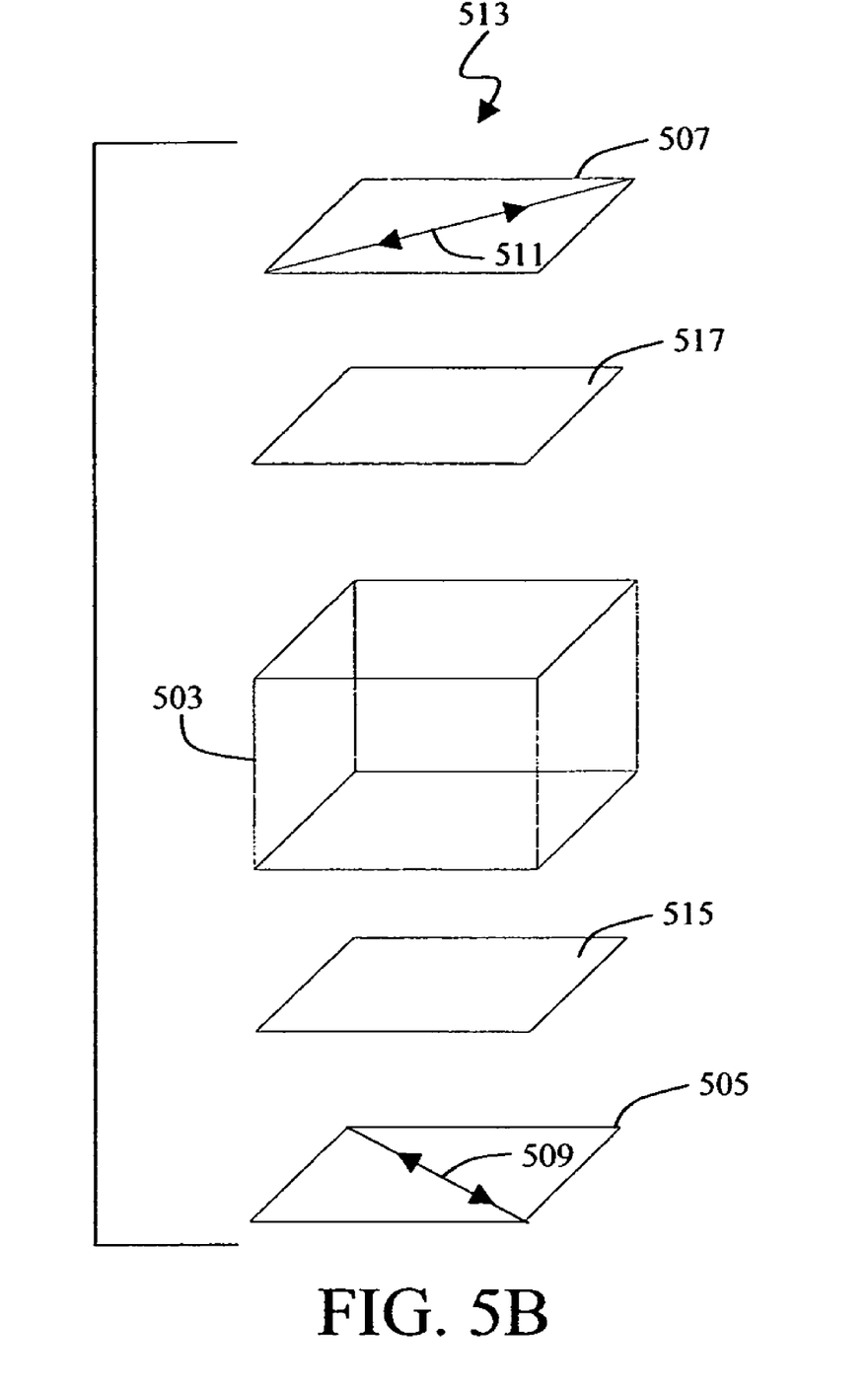
Figure 5C:
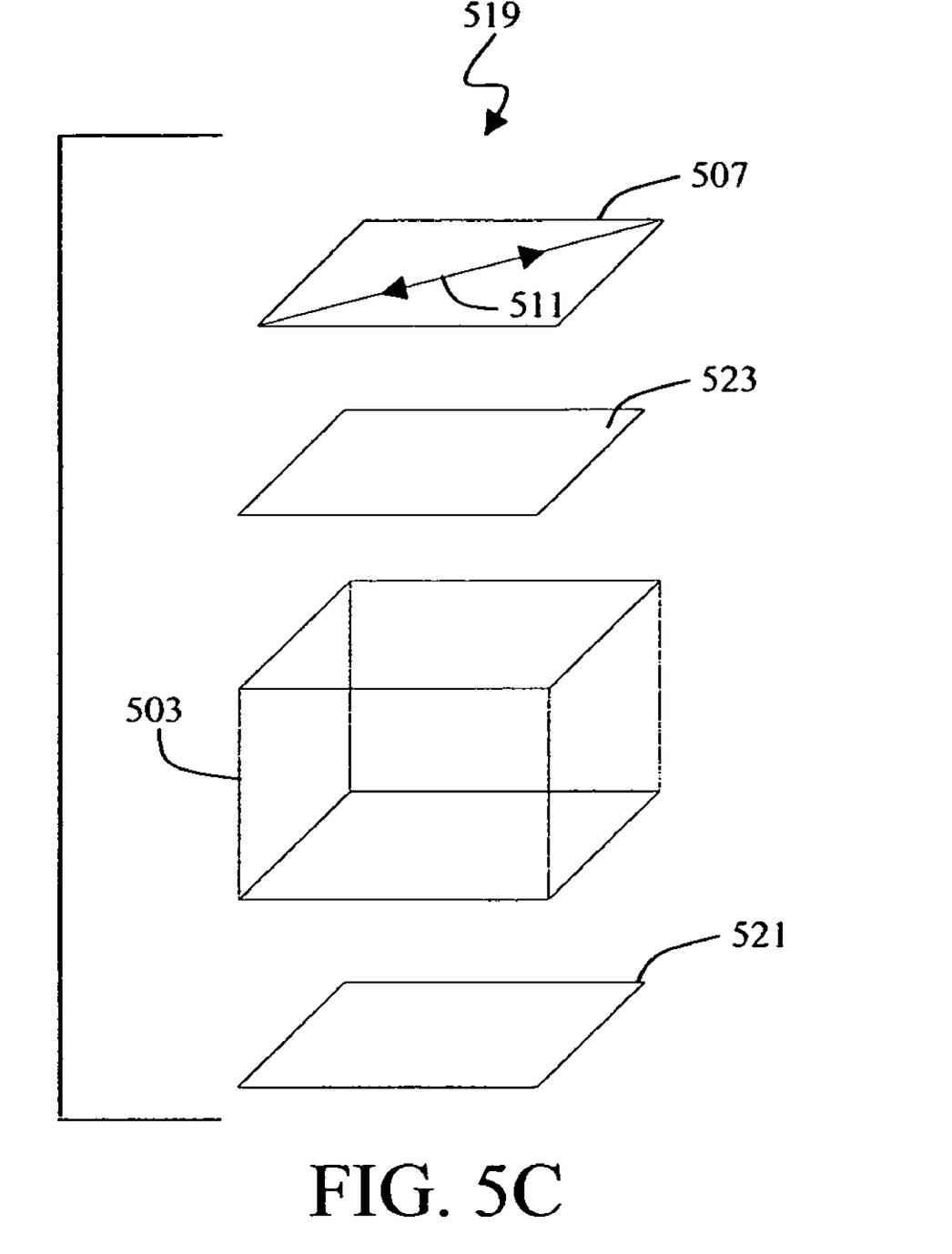

In LCD 501 shown in FIG. 5A, the liquid crystal cell 503 is placed between the polarizer 505 and analyzer 507. Transmission axis of the polarizer 509 and analyzer 511 form angle 90±10° thus, pair of polarizer 509 and analyzer 511 are said to be "crossed polarizer". A multilayer optical compensator 512 is placed between the polarizer 505 and the liquid crystal cell 503. It can also be placed between the liquid crystal cell 503 and the analyzer 507. LCD 513 shown schematically in FIG. 5B has two multilayer optical compensators 515, 517 placed on the both sides of the liquid crystal cell 503. FIG. 5C shows an application example of multilayer optical compensator in a reflective type LCD 519. The liquid crystal cell 503 is located between the polarizer 505 and a reflective plate 521. In the figure, the multilayer compensator 523 is placed between the liquid crystal cell 503 and the polarizer 505. However, it can also be placed between the reflective plate 521 and the liquid crystal cell 503.

Compared to the prior art, embodiments of the present invention avoids retardation increasing agent that causes coloration, do not require the use of liquid crystal compounds and its alignment procedure, provide enhanced optical compensation in a relatively thin (<200 µm) structure, and are easily manufactured.

As a further attribute, embodiments enable the control of $R_{in}$, which is primarily the responsibility of the A layer while control of $R_{th}$ is primarily the responsibility of the B layer. In the prior art, $R_{in}$ and $R_{th}$ are often coupled and are not controlled independently.

The present invention is further illustrated by the following non-limiting examples of its practice.

EXAMPLE

Polymer 1 (Synthesis):

To a stirred mixture of 4,4'-hexafluoroisopropylidene-diphenol (23.53 g, 0.07 mole), 4,4'-(2-norbornylidene) bisphenol (8.4 g, 0.03 mole) and triethylamine (22.3 g, 0.22 mole) in methyl ethyl ketone (100 mL) at 10° C. was added a solution of terephthaloyl chloride (16.23 g, 0.8 mole) and isophthaloyl chloride (4.08 g, 0.2 mole) in methyl ethyl ketone (60 mL). After the addition, the temperature was allowed to rise to room temperature and the solution was stirred under nitrogen for 4 hours, during which time triethylamine hydrochloride precipitated in a gelatinous form and the solution became viscous. The solution was then diluted with toluene (160 mL) and washed with dilute hydrochloric acid, (200 mL of 2% acid) followed three times by water (200 mL). The solution was then poured into ethanol with vigorous stirring, and a white bead like polymer precipitated, collected and dried at 50° C. under vacuum for 24 hours. The glass transition temperature of this polymer was measured by differential scanning calorimetry to be 265° C.

Poly(4,4'-hexafluoroisopropylidene-bisphenol-co-4,4'-(2-norbornylidene) bisphenol) terephthalate-co-isophthalate.

Polymer 1

Polymer 1 was spun cast (8% solids in 80% propylacetate 20% toluene) onto both a glass slide and a stretched polymer substrate sample, and was analyzed with an ellipsometer (model M2000V, J. A. Woollam Co.) at 550 nm wavelength to obtain the $R_{th}$ and $R_{in}$. These values are listed in TABLE I.

TABLE I

| Sample | $R_{in}$ (nm) | $R_{th}$ (nm) |
| --- | --- | --- |
| Polymer 1 on glass | 0.6 | −38 |
| Stretched polymer substrate | 40.0 | −123 |
| Polymer A on stretched polymer substrate | 35.0 | −190 |

The layer of polymer 1 also did not show any sign of a long-range order therefore the layer was determined to be comprised of an amorphous polymer.

PARTS LIST 101 film
103 plane of the film
201 VA liquid crystal cell in OFF state
203 VA liquid crystal cell in ON state
205 liquid crystal optic axis
207 liquid crystal cell substrate
209 light propagating cell normal direction
211 light propagating oblique direction
301 OCB liquid crystal cell in OFF state
303 OCB liquid crystal cell in ON state
305 liquid crystal optic axis
307 cell middle plane
309 cell boundaries
401 multilayer optical compensator
403 multilayer optical compensator
405 multilayer optical compensator
407 A layer
409 B layer
411 A layer
413 B layer
415 B layer
417 B layer
419 A layer
421 A layer
501 LCD
503 liquid crystal cell
505 polarizer
507 analyzer
509 transmission axis of polarizer
511 transmission axis of analyzer
512 multilayer optical compensator
513 LCD
515 multilayer optical compensator
517 multilayer optical compensator
519 LCD
521 reflective plate
523 multilayer optical compensator
nx index of refraction in x direction
ny index of refraction in y direction
nz index of refraction in z direction
no ordinary index of refraction
ne extraordinary index of refraction
$\Delta n_{th}$ out-of-plane birefringence
$\Delta n_{in}$ in-plane birefringence
$\Delta n_{int}$ intrinsic birefringence of polymer
d thickness of the layer or film
$R_{th}$ out-of-plane phase retardation
$R_{in}$ in-plane phase retardation
λ wavelength
$T_g$ glass transition temperature

What is claimed is:

1. A process for forming a multilayer compensator for a liquid crystal display comprising coating a B layer in a solvent onto an A layer; wherein one or more A layers have in-plane retardation greater than 20 nm and one or more B layers contain an amorphous polymer, have a out-of-plane birefringence more negative than −0.01 and comprise selected polymeric materials having sufficient thickness so that the overall in-plane retardation (Rin) of said multilayer compensator is greater than 20 nm and the overall out-of-plane retardation (Rth) of said multilayer compensator is more negative than −20 nm; wherein the polymers of said one or more B layers do not have chromophores off of the backbone; the multilayer compensator is biaxial; and the term "amorphous" means that the polymer does not show long-range order as measured by X-ray diffraction.

2. The process of claim 1 wherein at least one B layer of the multilayer compensator comprises a polymer containing in the backbone a non-visible chromophore group and has a $T_g$ above 180° C.

3. The process of claim 1 wherein a B layer comprises a polymer containing in the backbone a nonvisible chromophore containing a vinyl, carbonyl, amide, imide, ester, carbonate, aromatic, sulfone, or azo, phenyl, naphthyl, biphenyl, bisphenol, or thiophene group.

4. The process of claim 1 wherein a B layer comprises a copolymer containing 1) a poly(4,4'-hexafluoroisopropylidene-bisphenol) terephthalate-co-isophthalate, 2) a poly(4,4'-hexahydro-4,7-methanoindan-5-ylidene bisphenol) terephthalate, 3) a poly(4,4'-isopropylidene-2,2',6,6'-tetrachlorobisphenol) terephthalate-co-isophthalate, 4) a poly(4,4'-hexafluoroisopropylidene)-bisphenol-co-(2-norbornylidene)-bisphenol terephthalate, 5) a poly(4,4'- hexahydro-4,7-methanoindan-5-ylidene)-bisphenol-co-(4,4'-isopropylidene-2,2',6,6'-tetrabromo)-bisphenol terephthalate, 6) a poly(4,4'-isopropylidene-bisphenol-co-4,4'-(2-norbornylidene) bisphenol) terephthalate-co-isophthalate, or 7) a poly(4,4'-hexafluoroisopropylidene-bisphenol-co-4,4'-(2-norbornylidene) bisphenol) terephthalate-co-isophthalate.

5. The process of claim 1 wherein an A layer contains a polymer that comprises triacetylcellulose, cellulose diacetate, cellulose acetate butyrate, polycarbonate, cyclic polyolefin or polyarylate containing fluorene groups.

6. A process for forming a multilayer compensator for a liquid crystal display comprising coating a B layer in a solvent onto an A layer; wherein one or more A layers comprise a polymer having an out-of-plane birefringence not more negative than −0.01; one or more B layers comprise an amorphous polymer having an out-of-plane birefringence more negative than -0.01 and do not have chromophores off of the backbone; the multilayer compensator is biaxial; the overall in-plane retardation (Rin) of said multilayer compensator is greater than 20 nm; the overall out-of-plane retardation (Rth) of said multilayer compensator is more negative than −20nm; and the term "amorphous" means that the polymer does not show long-range order as measured by X-ray diffraction.

7. The process of claim 6 wherein at least one B layer of the multilayer compensator comprises a polymer containing in the backbone a non-visible chromophore group and has a $T_g$ above 180° C.

8. The process of claim 6 wherein a B layer comprises a polymer containing in the backbone a nonvisible chromophore containing a vinyl, carbonyl, amide, imide, ester, carbonate, aromatic, sulfone, or azo, phenyl, naphthyl, biphenyl, bisphenol, or thiophene group.

9. The process of claim 6 wherein a B layer comprises a copolymer containing 1) a poly(4,4'-hexafluoroisopropylidene-bisphenol) terephthalate-co-isophthalate, 2) a poly(4,4'-hexahydro-4,7-methanoindan-5-ylidene bisphenol) terephthalate, 3) a poly(4,4'-isopropylidene-2,2',6,6'-tetrachlorobisphenol) terephthalate-co-isophthalate, 4) a poly(4,4'-hexafluoroisopropylidene)-bisphenol-co-(2-norbornylidene)-bisphenol terephthalate, 5) a poly(4,4'-hexahydro-4,7-methanoindan-5-ylidene)-bisphenol-co-(4,4'-isopropylidene-2,2',6,6'-tetrabromo)-bisphenol terephthalate, 6) a poly(4,4'-isopropylidene-bisphenol-co-4,4'-(2-norbornylidene) bisphenol) terephthalate-co-isophthalate, or 7) a poly(4,4'-hexafluoroisopropylidene-bisphenol-co-4,4'-(2-norbornylidene) bisphenol) terephthalate-co-isophthalate.

10. The process of claim 6 wherein an A layer contains a polymer that comprises triacetylcellulose, cellulose diacetate, cellulose acetate butyrate, polycarbonate, cyclic polyolefin or polyarylate containing fluorene groups.

11. A process for forming a multilayer compensator for a liquid crystal display comprising coating a B layer in a solvent onto an A layer; and one or more B layers contain an amorphous polymer, have a out-of-plane birefringence more negative than −0.01 and comprise selected polymeric materials having sufficient thickness so that the overall in-plane retardation (Rin) of said multilayer compensator is greater than 20 nm and the overall out-of-plane retardation (Re) of said multilayer compensator is more negative than −20 nm; wherein the polymers of said one or more B layers do not have chromophores off of the backbone; the multilayer compensator is biaxial; and the term "amorphous" means that the polymer does not show long-range order as measured by X-ray diffraction.

12. The process of claim 11 wherein the coating is applied by spin coating, hopper coating, gravure coating, or wire bar coating.

13. The process of claim 11 wherein the coating is applied by hopper coating.

14. The process of claim 11 wherein the coating is applied by spin coating.

15. The process of claim 11 wherein the solvent contains toluene.

16. The process of claim 11 wherein the solvent contains propyl acetate.

17. A process for forming a multilayer compensator for a liquid crystal display comprising laminating a B layer onto an A layer; wherein one or more A layers have in-plane retardation greater than 20 nm and one or more B layers contain an amorphous polymer, have a out-of-plane birefringence more negative than −0.01 and comprise selected polymeric materials having sufficient thickness so that the overall in-plane retardation (Rin) of said multilayer compensator is greater than 20 nm and the overall out-of-plane retardation (Rth) of said multilayer compensator is more negative than −20 nm; wherein the polymers of said one or more B layers do not have chromophores off of the backbone; the multilayer compensator is biaxial; and the term "amorphous" means that the polymer does not show long-range order as measured by X-ray diffraction.

* * * * *